(12) United States Patent
Wen et al.

(10) Patent No.: US 7,933,443 B2
(45) Date of Patent: *Apr. 26, 2011

(54) IMAGE VARIETY ON EDIBLE SUBSTRATES

(75) Inventors: Lufang Wen, Mason, OH (US); Benito Alberto Romanach, Mason, OH (US); Amy Dawson Phillips, Cincinnati, OH (US)

(73) Assignee: The Procter Gamble Company, Cincinnati, OH (US)

( * ) Notice: Subject to any disclaimer, the term of this patent is extended or adjusted under 35 U.S.C. 154(b) by 156 days.

This patent is subject to a terminal disclaimer.

(21) Appl. No.: 12/535,764

(22) Filed: Aug. 5, 2009

(65) Prior Publication Data

US 2010/0028511 A1    Feb. 4, 2010

Related U.S. Application Data (63) Continuation of application No. 10/887,032, filed on Jul. 8, 2004, now Pat. No. 7,593,563.

(60) Provisional application No. 60/486,311, filed on Jul. 11, 2003, provisional application No. 60/503,719, filed on Sep. 17, 2003.

(51) Int. Cl.
*G06K 9/00* (2006.01)
*A22C 13/00* (2006.01)

(52) U.S. Cl. .......................................... 382/141; 426/87

(58) Field of Classification Search .................. 382/141; 426/87

See application file for complete search history.

(56) References Cited

U.S. PATENT DOCUMENTS

| | | | |
|---|---|---|---|
| 3,498,798 A | 3/1970 | Bauer | |
| 3,520,248 A | 7/1970 | MacKendrick | |
| 3,576,647 A | 4/1971 | Liepa | |
| 3,608,474 A | 9/1971 | Liepa | |
| 3,626,466 A | 12/1971 | Liepa | |
| 3,973,719 A | 8/1976 | Johnson et al. | |
| 4,168,662 A | 9/1979 | Fell | |
| 4,585,484 A | 4/1986 | Haruta et al. | |
| 4,645,679 A | 2/1987 | Lee, III et al. | |
| 4,910,661 A | 3/1990 | Barth et al. | |
| 4,920,422 A | 4/1990 | Lapierre | |
| 4,930,018 A | 5/1990 | Chan et al. | |
| 4,940,998 A | 7/1990 | Asakawn | |
| 5,012,257 A | 4/1991 | Lowe et al. | |
| 5,021,802 A | 6/1991 | Allred | |
| 5,031,050 A | 7/1991 | Chan | |
| 5,118,351 A | 6/1992 | Shirota et al. | |
| 5,397,387 A | 3/1995 | Deng et al. | |
| 5,453,121 A | 9/1995 | Nicholls et al. | |
| 5,463,412 A | 10/1995 | Matsuda | |
| 5,464,642 A | 11/1995 | Villagran et al. | |

FOREIGN PATENT DOCUMENTS

WO    WO 01/94116 A2 *  12/2001

* cited by examiner

*Primary Examiner* — John B Strege
(74) *Attorney, Agent, or Firm* — Cynthia L. Clay; Kim William Zerby (57) ABSTRACT

An article of commerce comprising an edible substrate having an image disposed thereon, and a method for making edible substrates having a variety of different images.

19 Claims, 3 Drawing Sheets

IMAGE VARIETY ON EDIBLE SUBSTRATES

CROSS REFERENCE TO RELATED APPLICATIONS

This application is a continuation application of U.S. application Ser. No. 10/887,032, filed Jul. 8, 2004 now U.S. Pat. No. 7,593,563, which claims the benefit of priority to U.S. Provisional Application Ser. No. 60/486,311, filed Jul. 11, 2003, and to U.S. Provisional Application Ser. No. 60/503,719, filed Sep. 17, 2003.

FIELD OF INVENTION

The present invention relates to articles of commerce comprising a plurality of edible substrates, more particularly wherein the edible substrates have an image disposed thereon.

BACKGROUND OF THE INVENTION

Printing on edible items such as snacks can provide an added level of excitement beyond the snacking itself. The printed content can be in the form of graphics, text or combinations, and it can be used to deliver, for example, games, stories, jokes, and educational facts. This new level of excitement is, however, a function of how new the printed content is to the consumer. Such is the case, for example, of reading a joke for the second time. In this case the joke may not be effective any longer at creating an impact or sustaining the interest. Also, when being exposed to an image for the second time, a consumer may no longer be interested in it because she is already familiar with it. To sustain a high level of excitement upon consumption of printed edible items it is, therefore, important, to provide consumers with variety of content within a unit purchase and over multiple purchases.

This could be accomplished by a very large database of content from which to draw for printing. But this could be difficult to manage since all content would typically need to be reviewed and approved for use, and a system to store all content could be more complex. For example, stacked fabricated potato crisps like Pringles®, are a popular snack item sold as stacks of crisps within canisters, that lend themselves well for printing for having consistent planar surfaces that can be printed. However, billions of individual Pringle® crisps are sold every year. It would be very difficult to provide a database with printed content that would be unique for this many snack crisps, in order to provide consumers new printed content in every canister purchase. Furthermore, the licensing fees of images provided by content providers could potentially be much higher as a result of needing to use more varied content.

It would be, therefore, advantageous to devise methods to deliver new printed content consistently to consumers with every unit purchase. Furthermore, it would be advantageous to do so while minimizing the number of images used in the process.

SUMMARY OF THE INVENTION

In one aspect, the present invention provides a method of making edible substrates having a variety of images disposed thereon. The value of the article can be enhanced and sustained by providing a variety of images to the consumer. Such variety leads in turn to a sustained level of consumer engagement and stimulation, increased product desirability, and also serves to build a stronger relationship between the article manufacturer and the consumer.

In one aspect, the present invention provides a method of making a fabricated snack chip having an image disposed thereon. In one embodiment, the method comprises:
(a) providing a fabricated snack piece;
(b) providing an image source, wherein said image source comprises a plurality of different images;
(c) creating a script, wherein said script comprises a script image selected from said image source;
(d) communicating a script image from the script to an image disposal device;
(e) disposing said script image on said fabricated snack piece with said image disposal device to form an image-disposed fabricated snack piece.

In another aspect, the present invention provides a method of making fabricated snack chips having a variety of images disposed thereon. In one embodiment, the method comprises:
(a) providing a stream of fabricated snack pieces, wherein said stream comprises a plurality of fabricated snack pieces;
(b) providing an image source, wherein said image source comprises a plurality of different images;
(c) creating a script, wherein said script comprises a plurality of script images selected from said image source, and wherein said script images are arranged in a pre-determined order in the script;
(d) communicating script images in a pre-determined order from the script to an image disposal device;
(e) disposing script images on fabricated snack pieces with said image disposal device to form image-disposed fabricated snack pieces.

A plurality of image-disposed fabricated snack pieces can be placed in a container to form an article of commerce.

In another aspect, the present invention provides a method of making edible substrates having a variety of images disposed thereon. In one embodiment, the method comprises:
(a) providing a stream of edible substrates, wherein said stream comprises a plurality of edible substrates;
(b) providing an image source, wherein said image source comprises a plurality of different images;
(c) creating a script, wherein said script comprises a plurality of script images selected from said image source, and wherein said script images are arranged in a pre-determined order in the script;
(d) communicating a plurality of script images in a pre-determined order from the script to an image disposal device;
(e) disposing a plurality of script images on a plurality of edible substrates to form a plurality of image-disposed edible substrates, wherein said image-disposed edible substrates have a level of pattern change of from 2% to 100%.

The image-disposed edible substrates of (e) can be packaged in one or a plurality of packages to form one or a plurality of articles of commerce.

In yet another aspect, the present invention provides a method of creating a modified script. In one embodiment, the method comprises:
(a) providing a stream of edible substrates, wherein said stream comprises a plurality of edible substrates;
(b) providing an image source, wherein said image source comprises a plurality of different images;
(c) creating a script, wherein said script comprises a script image selected from said image source;
(d) communicating a script image from the script to an image disposal device;

(e) disposing said script image on a first edible substrate to form a first image-disposed edible substrate;

(f) detecting an image on said first image-disposed edible substrate;

(g) evaluating said detected image and providing feedback to modify said script of images, as a function of the evaluation of said detected image, to create a modified script;

(h) communicating a second script image from said modified script to an image disposal device;

(i) disposing said second script image on a second edible substrate with said image disposal device to form a second image-disposed edible substrate These and other features, aspects, and advantages of the present invention will become evident to those skilled in the art from reading of the present disclosure.

All documents cited herein are incorporated by reference in their entirety. The citation of any document is not to be construed as an admission that it is prior art with respect to the present invention.

BRIEF DESCRIPTION OF THE DRAWINGS

FIG. 7: Analogous to FIG. 6.

FIG. 9: Analogous to FIG. 8.

DETAILED DESCRIPTION OF THE INVENTION

1. Method

In one aspect, the present invention provides a method of making a fabricated snack chip having an image disposed thereon. In one embodiment, the method comprises:
    (a) providing a fabricated snack piece;
    (b) providing an image source, wherein said image source comprises a plurality of different images;
    (c) creating a script, wherein said script comprises a script image selected from said image source;
    (d) communicating a script image from the script to an image disposal device;
    (e) disposing said script image on said fabricated snack piece to form an image-disposed fabricated snack piece.

In another aspect, the present invention provides a method of making fabricated snack chips having a variety of images disposed thereon. In one embodiment, the method comprises:
    (a) providing a stream of fabricated snack pieces, wherein said stream comprises a plurality of fabricated snack pieces;
    (b) providing an image source, wherein said image source comprises a plurality of different images;
    (c) creating a script, wherein said script comprises a plurality of script images selected from said image source, and wherein said script images are arranged in a pre-determined order in the script;
    (d) communicating script images in a pre-determined order from the script to an image disposal device;
    (e) disposing script images on fabricated snack pieces to form image-disposed fabricated snack pieces.

A plurality of image-disposed fabricated snack pieces can be placed in a container to form an article of commerce.

In another aspect, the present invention provides a method of making edible substrates having a variety of images disposed thereon. In one embodiment, the method comprises:
    (a) providing a stream of edible substrates, wherein said stream comprises a plurality of edible substrates;
    (b) providing an image source, wherein said image source comprises a plurality of different images;
    (c) creating a script, wherein said script comprises a plurality of script images selected from said image source, and wherein said script images are arranged in a pre-determined order in the script;
    (d) communicating a plurality of script images in a pre-determined order from the script to an image disposal device;
    (e) disposing a plurality of script images on a plurality of edible substrates to form a plurality of image-disposed edible substrates, wherein said image-disposed edible substrates have a level of pattern change of from 2% to 100%.

a. Edible Substrate

As used herein, "edible substrate" or "substrate" includes any material suitable for consumption that is capable of having an image disposed thereon. Any suitable edible substrate can be used with the invention herein. Examples of suitable edible substrates can include, but are not limited to, snack chips (e.g., sliced potato chips), fabricated snacks (e.g., fabricated chips such as tortilla chips, potato chips, potato crisps), extruded snacks, cookies, cakes, chewing gum, candy, bread, fruit, dried fruit, beef jerky, crackers, pasta, sliced meats, sliced cheese, pancakes, waffles, dried fruit film, breakfast cereals, and toaster pastries.

In a preferred embodiment, the edible substrate comprises a fabricated snack piece, preferably a fabricated snack chip, and more preferably a fabricated potato crisp. Suitable snack pieces include those described in "Chip Frying Machine," U.S. Pat. No. 3,520,248, issued Jul. 14, 1970, to MacKendrick; "Preparation of Chip-Type Products," U.S. Pat. No. 3,576,647, issued Apr. 27, 1971, to Liepa; "Apparatus for Preparing Chip-Type Products," U.S. Pat. No. 3,608,474, issued Sep. 28, 1971, to Liepa; and "Molding Device for Preparing Chip-Type Products," U.S. Pat. No. 3,626,466, issued Dec. 7, 1971, to Liepa; Lodge in U.S. Pat. No. 5,464,643, and Villagran et al. in U.S. Pat. No. 6,066,353 and U.S. Pat. No. 5,464,642. In one embodiment, the fabricated snack chip is a fabricated potato crisp, such as that described by Lodge in U.S. Pat. No. 5,464,643, and Villagran et al. in U.S. Pat. No. 6,066,353 and U.S. Pat. No. 5,464,642. Other snack chips that can be used herein include those described in "Process for Making a Corn Chip with Potato Chip Texture," U.S. Pat. No. 4,645,679, issued Feb. 24, 1987 to Lee, III et al.

In addition, the edible substrate can include pet foods such as, but not limited to, dog biscuits and dog treats.

The edible substrate can be in any suitable form. For example, the substrate can be a finished food product ready for consumption, a food product that requires further preparation before consumption (e.g., snack chip dough, dried pasta), or combinations thereof. Furthermore, the substrate can be rigid (e.g., fabricated snack chip) or non-rigid (e.g., dried fruit film). In one embodiment, the edible substrates are connected to one another (e.g., in the form of a dough sheet prior to cutting the individual pieces).

As used herein, "fabricated snack piece" or "snack piece" is broad enough to include a snack piece that has not yet been separated (e.g., cut) from a dough. For example, in one embodiment, an image is disposed upon a dough sheet, then the dough sheet is later cut into individual pieces. Furthermore, "fabricated snack piece" or "snack piece" is broad enough to include both cooked (e.g., fried) and un-cooked (e.g., dough) substrates.

Preferably, the edible substrates are provided as a stream of substrates. As used herein, "stream" means a continuous source of substrates. For example, a stream of substrates can include a plurality of substrates such as that provided by a conveyor belt or as a feed from a continuous, semi-continuous, or batch process.

b. Image Source

As used herein an "image source" includes any collection of one or more images from which a script can be created. For example, the image source can be an electronic (e.g., computer-based) database, a plurality of databases, or a collection of hard-copy images.

Images can be in any suitable form, preferably electronic media such as that generated using computer software and stored on an electronic storage device, such as a computer, computer disk, RAM, or ROM, or visual display. Any suitable computer system, as known in the art, can be used.

Preferably, all the images in the image source are different from one another. However, in one embodiment, at least two of the images in an image source are the same.

Preferably, each image can be identified by an identifier, e.g., a sequential number or letter, that allows the image to be selected from the image source. For example, in one embodiment, each image is identified by a unique number (e.g., 100 images are each assigned a different number from 1 to 100). Assigning an identifier to each image allows for, among other things, cataloging of images and selection of images from the source by identifier (e.g., by number or letter). In another embodiment, an identifier is assigned to a portion of a cluster of images.

Any suitable image can be used. The image can comprise one or more graphic elements, one or more text elements, or combinations thereof. As used herein, "text" means one or more alpha-numeric symbols. Text can include letters, numbers, words, and combinations thereof.

As used herein, "graphic" means pictorial representation. For instance, the graphic can include objects, symbols, scenes, people, animals, toys, or characters. Suitable characters can include cartoon characters and licensed characters, as well as characters associated with popular personalities in the media, advertising, or well known in the particular culture.

Non-limiting examples of suitable images include letters, numbers, words, animals, cartoon characters, popular figures from the media, caricatures, historic events, and photographs.

Furthermore, images can be in the form of full or partial words, numbers, clues, hints, jokes, revelations, trivia quizzes, photographs, pictures, puzzles, stories, games, or sequence of events (e.g. animations). For example, the image can comprise the question portion of a trivia quiz. In one embodiment, the image depicts a piece of a jig-saw puzzle.

Furthermore, the image can be permanent or active. Permanent images include those that do not change before consumption of the edible substrate. Active images include those that can be modified by some means before consumption of the edible substrate.

For example, active images include those that can be visually modified. In one embodiment, an invisible image becomes visible when the substrate comes into contact with saliva (e.g., the substrate is licked). In another embodiment, the image becomes visible when the substrate is held under a black light source. In yet another embodiment, the visible image becomes invisible when the substrate comes into contact with saliva. In still another embodiment, the visible image disappears and a second, different, image appears when the substrate comes into contact with saliva.

As used herein, "images" or "plurality of images" also includes a continuous image source (e.g., a ribbon or band) that is disposed on or across multiple substrates. For example, in one embodiment, different, discrete portions of an image (e.g., a chain or row of flowers) are disposed on a plurality of substrates. Thus, according to the present invention, a continuous image source can provide the source of multiple images.

c. Script

As used herein, a "script" is a sequence of one or more images. The script images are arranged in a pre-determined order. A "script image" refers to an image that is part of a script. According to the present invention, a script is created from one or more images selected from an image source. The pre-determined order of the script is determined by any suitable scripting methodology. The script provides the sequence (e.g., order) of images that are disposed upon a plurality of edible substrates.

Any suitable scripting methodology can be used to create a script. For example, the methodology can be a particular sequence (e.g., ordering the script images in the same sequence as they are found in the image source), can be in a particular pattern (e.g. every other image from the source), can be selected individually or as a batch, or can be random.

Furthermore, scripting can occur "live" (e.g., contemporaneous with image disposal) or "pre-recorded" (e.g., a script is created in advance of image disposal).

In one embodiment employing a random scripting methodology, each script image is selected at random from the subset of images that remain after each image is selected from the source. Each image is drawn from the subset of images that remains after each image is randomly selected from the remaining images in the cycle. As used herein, a "cycle" means one complete utilization of each image in the database. In a particular execution of this embodiment, the number of images in the cycle is equal to or greater than the number of image-disposed substrates to be contained in a particular container. In the preferred embodiment of this execution, all the images are different. This embodiment can result in a container of substrates wherein each image-disposed substrate in the container has a different image disposed thereon.

In a particular embodiment, all the images in the cycle are different, and the number of images in the cycle is equal to: the number of image-disposed substrates to be contained in a particular container+(plus) an additional pre-determined number of images. This additional pre-determined number of images can be equal to or greater than the absolute or average number of image-disposed substrates pulled for quality sampling, discards, and/or other types of loss. Furthermore, by including an additional pre-determined number of images as above, containers of image-disposed edible substrates where all the images are different in each container can still be produced, even if there are losses in the manufacturing system for any of a variety of reasons (e.g., sampling, discards, etc.).

In another embodiment, each script image is selected at random from the entire set of images in the source.

According to the method herein, all or a subset of the images in an image source can be used to create a script.

d. Image Disposal

According to the present invention, the script images are communicated in a pre-determined order from the script to an image disposal device. The image disposal device then disposes one or more images on one or more edible substrates to form one or more image-disposed edible substrates. As used herein, an "image-disposed edible substrate" is an edible substrate having an image disposed thereon. The disposed image can cover part or all of the visual portion of the edible substrate. In addition, the image can include one or more text or graphics disposed upon said edible substrate.

As used herein, "disposed on" means that one element can be integral with another element, or that one element can be a separate structure bonded to or placed on another element. Thus, the image can be applied directly or indirectly to the edible substrate, applied to a material that is placed on the edible substrate, applied within the edible substrate, or other variations or combinations thereof. In particular embodiments, the image can be printed, sprayed, or other wise applied directly on the surface of the substrate. In other embodiments, the image can be applied to a material placed on the surface of the substrate. The image can be located on the outer surface of the substrate, or can be located on the interior of the substrate, or combinations thereof.

Any suitable means of disposing an image on the substrate can be used herein. For example, the image can be printed, drawn, painted, or otherwise attached to the edible substrate. The image can be single-color or multi-color. The image can comprise dyes, pigments, other natural or synthetic substances, or combinations thereof.

The image can be disposed on the edible substrate before or after a cooking process (e.g., before or after a dough sheet is baked or fried). Furthermore, the image can be disposed on the edible substrate before or after it is cut into individual pieces (e.g., before or after a dough sheet is cut into individual cookie or snack chip pieces).

In one embodiment, the image is printed on the substrate. Methods of printing can include, but are not limited to, laser, ink jet (e.g., thermal bubble jet, piezoelectric drop on demand, continuous ink jet), gravure, flexographic, and stamping.

In a particular embodiment, the image can have a resolution of from about 90 to about 1200 dpi (dots per inch), preferably from about 100 to about 600 dpi, more preferably from about 120 to about 350 dpi.

In another embodiment, an edible sticker comprising an image is affixed to the substrate.

In another embodiment, a thin film comprising an image is affixed to the substrate via edible adhesive.

In a preferred embodiment, an ink jet image is printed on a fabricated snack chip.

In one embodiment, more than one surface of the edible substrate has an image disposed thereon. For example, a plurality of image disposal devices can be employed, each one to dispose an image on different sides of the edible substrate (e.g., top, bottom, and/or side)

In one embodiment, the image disposal device comprises a printer. Preferably, digital printing is used, such as inkjet printing systems (e.g., continuous jet, drop-on-demand), such as those described in WO 01/94116 by Willcocks et al., published Dec. 13, 2001. In a preferred embodiment, an ink-jet printer disposes images on a dough sheet, which is cut into individual pieces then fried to form fabricated snack chips.

e. Means of Practicing the Method

The method herein can be practiced by any suitable means. For example, it can be practiced in batch, semi-batch, and continuous mode. The method can be practiced using manufacturing environments having single manufacturing rows (e.g., single streams of edible substrates) or multiple manufacturing rows (e.g., multiple streams of edible substrates). Preferably, the edible articles are maintained in linear registration through their complete processing and such that a consecutive group of edible substrates can be selected to be inserted into a container.

In embodiments employing multiple streams, either synchronized or un-synchronized image disposal systems can be used. As used herein, "synchronized image disposal" means multiple rows disposing the same images at the same time in the cross machine direction (e.g., disposing the same images at the same time on different rows).

As used herein, "un-synchronized image disposal" means multiple rows disposing different images at the same time in the cross machine direction. For example, the same script or identical script of images can be used to dispose different images at the same time across rows; each row is sourcing images from an identical script, yet each row is sourcing images from different starting points in the script. Alternatively, different scripts can be used to dispose different images at the same time across rows.

In one embodiment, multiple disposal devices are used to dispose images on each of a multiple of streams, but each disposal device disposes images from the same script out of synchronization. For example, there are 1000 images in the script; stream one begins disposal at image 101, stream two starts disposal at image 201, etc. The images are disposed in order from the script, but the sequence of disposal in each stream begins at a different point in the sequence.

Preferably, to maximize the variety of images delivered to a consumer upon purchasing a container with edible items with images disposed upon them, a script is used that introduces a pattern change. (The pattern change method is set forth infra, below.) One means to effect a pattern change includes selecting images at random from the set of images, wherein all images have an equal probability of being selected. In a variation of this embodiment, different images in said set of images have a different probability of being selected.

In a particular embodiment, a shuffling table is used to further randomize the articles of commerce in adjacent containers.

f. Method of Creating a Modified Script

In another aspect, the present invention provides a method of making edible substrates having a variety of images disposed thereon wherein a sensor is used to provide feedback for script construction. In one embodiment, the method comprises:

(a) providing a stream of edible substrates, wherein said stream comprises a plurality of edible substrates;
(b) providing an image source, wherein said image source comprises a plurality of different images;
(c) creating a script, wherein said script comprises a script image selected from said image source;
(d) communicating a script image from the script to an image disposal device;
(e) disposing said script image on a first edible substrate to form a first image-disposed edible substrate;
(f) detecting an image on said first image-disposed edible substrate;
(g) evaluating said detected image and providing feedback to modify said script of images, as a function of the evaluation of said detected image, to create a modified script;
(h) communicating a second script image from said modified script to an image disposal device;
(i) disposing said second script image on a second edible substrate with said image disposal device to form a second image-disposed edible substrate In this embodiment, a sensor is used to detect images disposed on edible substrates to provide feedback to a computer that controls the generation of a script of images to be disposed. The feedback is based on an evaluation of the detected image disposed, wherein if a first image is detected and it is of acceptable quality then a second image or no image can be incorporated in the script for subsequent disposal. If, however, a first image is detected and it is not of acceptable quality, a third image or no image can be added to a portion of the script instead, for subsequent disposal, or lack thereof, respectively. This method can be used when a sequence of images is desired among a number or edible substrates that are near to one another.

For example, an image of a question may be disposed on an edible substrate. If the sensor shows that the image of the question was disposed properly on the edible substrate, then it is appropriate to dispose an image of its corresponding answer on a subsequent edible substrate. If, however, the sensor detects that the image of the question was not disposed properly or not disposed at all, then the image of the corresponding answer is not disposed and a different image is disposed or no image is disposed instead. This ensures that questions and answers are near each other so that a consumer can easily find both.

In another example, a story can be divided into four images such that each image contains a portion of the story. The story can comprise text, graphics, or combinations thereof. For example, the story can comprise scenes from a movie, or one or more words of a sentence. The sensor is used to detect if the first of the four images is disposed properly, in which case the second image can be disposed. Subsequently, the sensor detects if the second image has been properly disposed, in which case the third image can be disposed. If, for example, the second image is not properly disposed, then the second image could be disposed again before proceeding to dispose the third image. This method ensures that all the parts of the story are near each other so that a consumer can have the complete story.

In a related example, instead of disposing each image and evaluating it before disposing the following image of the group of four images in the example above, some or all of the images may be disposed before the sensor detects the first image in the group. In this case, any image that is not properly disposed could be disposed again. Although such image would now be out of order, the consumer still has access to all the images of the group that form the story.

In another embodiment, the sensor is located at a distance from the image disposal device such that a number of images can be disposed before an image reaches the sensor. In this case, groups of images that go together can be spaced out by other images in between each of the images in the group. The spacing can, for example, be a function of how many images are allowed to be disposed from the point that a first image is disposed until it is detected by the sensor for evaluation.

2. Article of Commerce

The present invention answers the need for a method that can provide a variety of images disposed on edible substrates (unlike rotary or flexographic printing). This method makes possible an article of commerce comprising a variety of image-disposed edible substrates. In one aspect, the article of commerce comprises: (a) a container; and (b) a plurality of image-disposed edible substrates contained within said container, wherein the number of different images disposed upon said image-disposed edible substrates is equal to the number of image-disposed edible substrates contained in said container. In another embodiment, the number of different images disposed upon said image-disposed edible substrates is $\geq 10$, preferably $\geq 25$, more preferably $\geq 50$, still more preferably $\geq 100$, and even more preferably $\geq 200$. In yet another embodiment, the number of different images disposed upon said image-disposed edible substrates is equal to the number of edible substrates in one serving size of said edible substrates.

The article can optionally comprise a message associated with the container. In one embodiment, the message communicates to the consumer that all of the image-disposed edible substrates contained within said container have a different image disposed thereon. In another embodiment, the message communicates to the consumer that no two articles in a particular location (e.g., the consumer's store shelf) have the same images.

In one embodiment, a container comprises a plurality of edible substrates, wherein more than one edible substrate in said container comprises the same image. (e.g., at least two the same)

In another embodiment, a container comprises a plurality of edible substrates, wherein at least one edible substrate comprises an image. (e.g., at least one printed potato crisp in a container)

In another embodiment, a container comprises a plurality of edible substrates, wherein at least two edible substrates have images disposed thereon. At least two of the edible substrates have images that are different from one another.

The article of commerce comprises a container for containing said edible substrates. Any container from which the edible substrates can be dispensed, presented, displayed, or stored is suitable. Suitable containers include, but are not limited to, bags, canisters, boxes, bowls, plates, tubs, cups, paper wrappers, and cans.

In one embodiment, the container is a round cylindrical canister that can contain uniformly-shaped fabricated potato crisps. Suitable such containers can include those described in "Packaging of Chip-Type Snack Food Products," U.S. Pat. No. 3,498,798, issued Mar. 3, 1970, to Bauer et al.; and "Container Having a Membrane-Type Closure," U.S. Pat. No. 3,973,719, issued Aug. 10, 1976, to Johnson, et al.

In a preferred execution, the level of pattern change among the plurality of image-disposed edible substrates is from about 2% to about 100%. In one embodiment the level of pattern change is from about 5% to about 100%, in another embodiment from about 10% to about 100%, and in a particular embodiment from about 20% to about 100%. (See the methods section herein for the method to calculate level of pattern change.) The image-disposed edible substrates can be contained in one or a plurality of containers.

Method—Level of Pattern Change

The level of pattern change among a plurality of image-disposed edible substrates in a particular container is determined in accordance with the method set forth below.

Printing of edible articles using a rotary printer is known in the art (U.S. Pat. No. 5,534,281—Nabisco: Method of Making Printed Baked Goods). This method relies on an inking roller that transfers ink to a printer roller, which eventually transfers an image to the edible substrate. The images are engraved in the inking roller, in a manner such as to hold the ink where required and to enable transfer of the image to the printing roller. This method is very constrained in the amount of images that can be printed by the diameter of the inking roller since all engraved images are in the surface of the inking roller. Also, a sequence of printed edibles substrates always display the same order of images as is present on the periphery of the inking roller.

Using an electronic printing device such as an ink jet device, removes the limitation of images that can be printed, since images can be stored as digital information in a number limited only by the size of the computer equipment. Given the computer systems of today, this does not represent a meaningful limitation.

A large sequence of images can be printed via this electronic printing device and once the sequence has been printed, the system could go through the cycle again and print the sequence on a new set of edible substrates. This method of printing edible substrates can be applied to, for example, stackable potato crisps that lend themselves well for printing. Once printed, the potato pieces may undergo further processing like frying, baking, salting or seasoning, and then portioned and packaged. A typical operation of this kind uses a First In First Out approach, which helps to maintain control of the product to minimize breakage and enable high density packing. As product is stacked and packed into containers, the packed stacks retain the potato crisps with images printed thereon in the same order in which they where printed which corresponds to the sequence of images used. This, however, can lead to a problem of unpredictability for consumers when they purchase containers in the store. Depending on which container they choose from a store shelf, a portion of the sequence of images disposed on the potato crisps may overlap with a portion of the sequence of images disposed on a separate container they have either purchased earlier, or perhaps are buying simultaneously. The overlap may be so large that the consumer experiences very few if any new images. This can be disappointing to consumers because in general consumers want to see new printed content often.

Figure 6:
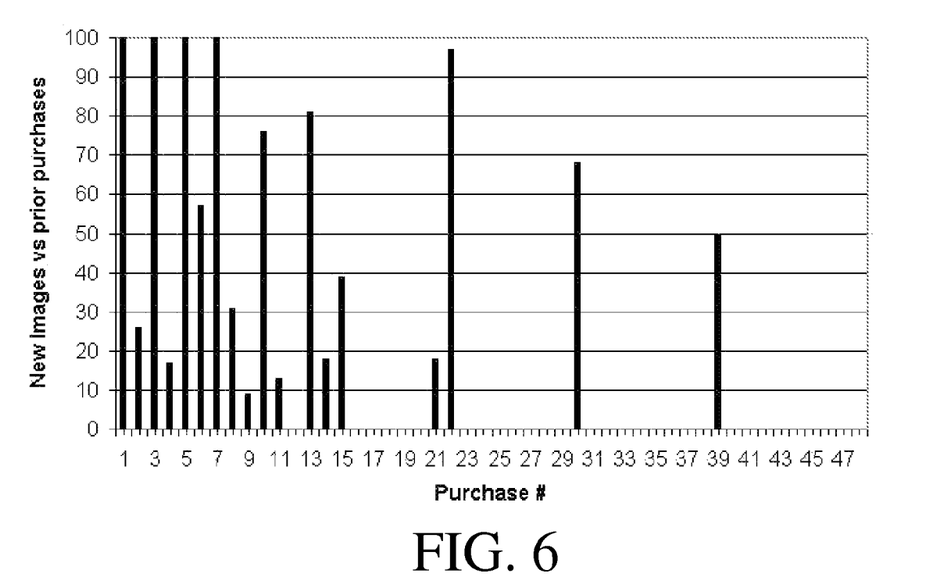
FIG. 6: This figure shows a simulation of the experiences that one consumer could encounter upon purchasing consecutive containers containing image-disposed edible substrates, wherein the images are printed on edible substrates always following the same sequence without inducing a pattern change. This assumes 1000 different images in an image source and that image-disposed edible substrates are packed in groups of 100.
Figure 7:
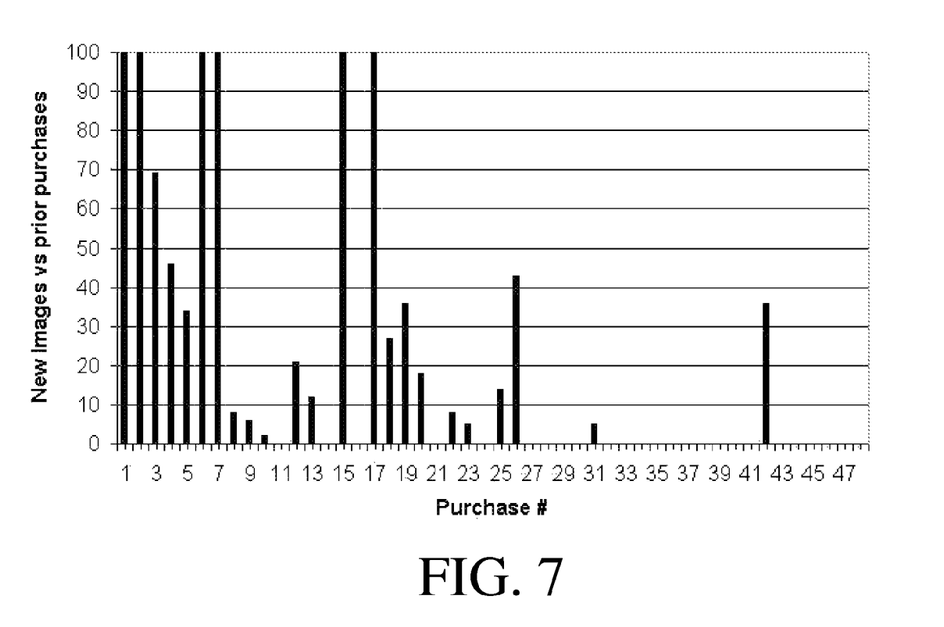
FIG. 7 shows another simulation of the experiences that one consumer could encounter upon purchasing consecutive containers containing image-disposed edible substrates, wherein the images are printed on edible substrates always following the same sequence without inducing a pattern change. This assumes 1000 different images in an image source and that image-disposed edible substrates are packed in groups of 100.

For example, if 1000 images are disposed on 1000 edible substrates in sequence, and then again on another 1000 edible substrates in the same sequence and so on, and these edible substrates are packed in groups of 100 in canisters, then, a consumer that purchases containers over time will experience new images in each subsequent purchase in a very erratic way. FIGS. 6 and 7 show two simulations for two such consumers. The horizontal x-axis shows the purchase number of canisters, so, for example, the number 3 in this axis represents the third canister purchased. The vertical axis shows the number of new images experienced by the consumer in the current purchase, and takes into account all images experienced in the prior purchases. As can be seen from FIGS. 6 and 7, in both instances, a consumer could purchase cans containing mostly new images and then again very few if any new images, versus her prior purchases. This unpredictability can be surprising to consumers.

Figure 8:
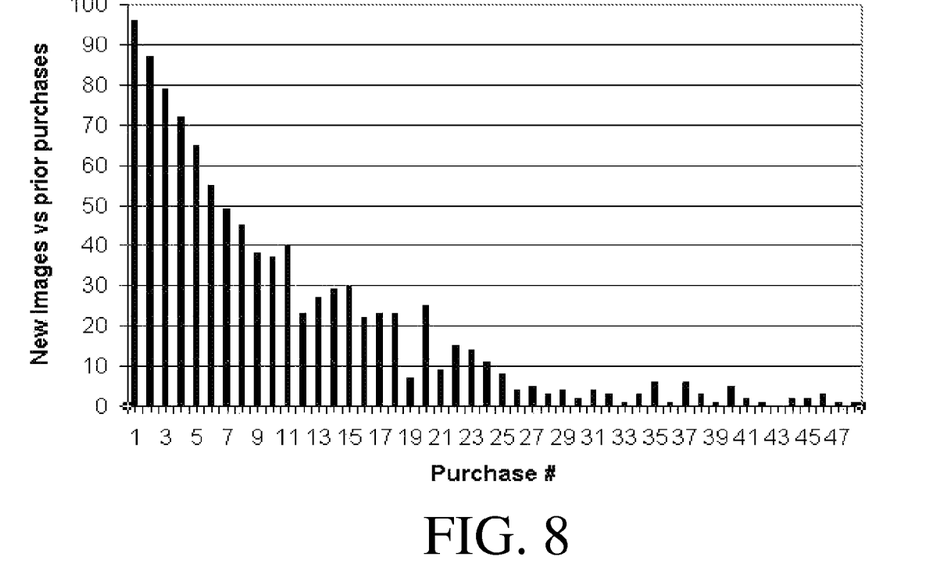
FIG. 8: This figure shows a simulation of the experiences that one consumer could encounter upon purchasing consecutive containers containing image-disposed edible substrates, wherein the images are printed on edible substrates following sequences with induced pattern changes. This assumes 1000 different images in an image source and that image-disposed edible substrates are packed in groups of 100.
Figure 9:
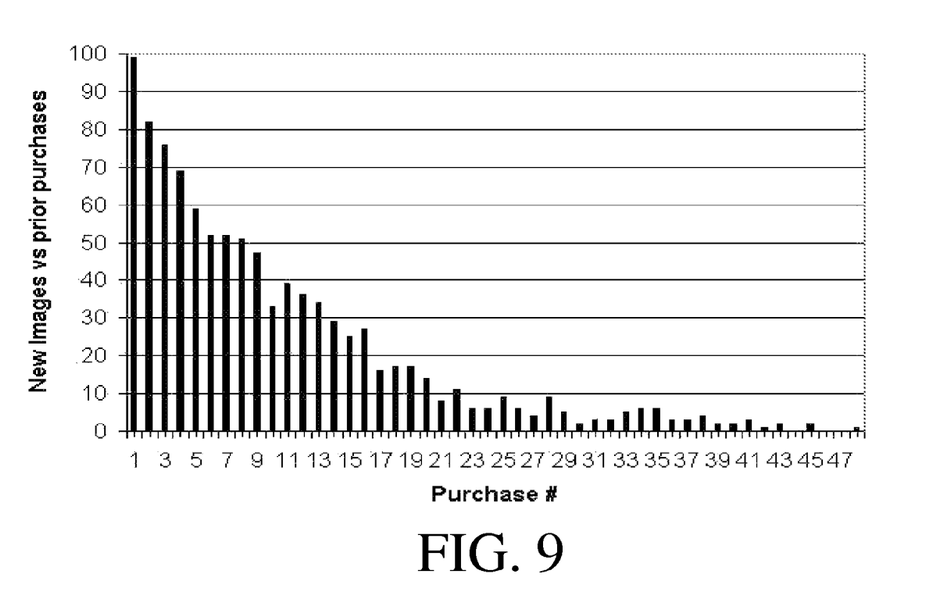
FIG. 9 shows another simulation of the experiences that one consumer could encounter upon purchasing consecutive containers containing image-disposed edible substrates, wherein the images are printed on edible substrates following sequences with induced pattern changes. This assumes 1000 different images in an image source and that image-disposed edible substrates are packed in groups of 100.

Surprisingly we have found that if the printing script includes pattern changes in the sequence of images, this can substantially lessen the unpredictability experienced by consumers, and although over time the number of new images available with subsequent purchases diminishes given a limited number of images available for printing, such decrease in the number of new images to a consumer can be described by a fairly smooth curve that allows the manufacturer to tailor changes to the images being printed as a function of total sales, purchase frequency by consumer segment, etc., and provide a consistent experience to consumers. FIGS. 8 and 9 show two simulations where 1000 images are disposed on edible substrates and the level of pattern change is greater than 50%. Note that this is fairly predictable and quite different than the experiences shown in FIGS. 6 and 7.

Pattern Change

A pattern changes when images are disposed in a different order than they have been disposed before. A pattern change can apply to any image. Note, however, that although images can be disposed in various orders, thus creating a pattern change, the following describes the kind of pattern change that provides an actual benefit. Note also that increasing the number of images that are involved in a pattern change, results in improved benefits, but only in as much as it is the pattern change that follows the description below.

To describe how to induce a meaningful pattern change around a first image, a minimum of three other images (second, third and fourth images) needs to be considered, wherein, the second, third and fourth images are all different among themselves, wherein the third and fourth images are also different than the first image, and wherein the second image can be the same as or different than the first image. Note that the absence of an image ("blank image") is counted as an image for the purposes of this method, but only when such blank image is found on a substrate that is found in a container that also contains edible substrates having images disposed thereon ("non-blank" images). Note also that the following description relates to how to induce a pattern change in reference to the first image to provide for the benefits of one of the aspects of this invention. In the context of this method, images that vary only in color (but possess the same printed region) are regarded as the "same" image. For example, an image of a house in red will be considered the same as an image of the same house in green. Similarly, if the roof of such house is red and the body of the house is green, that would still be considered as the same image. Also note that normal process variations in the printing of an image do not constitute basis to make an image different than a separate instance of disposing an image. So, for example, if an image of a house is disposed on an edible substrate and later the same image is disposed on another edible substrate and the image is somewhat stretched or misprinted for any reason but still recognizable as equivalent to the same image, then under this method, both resulting images would be regarded as the same image.

The method to create a pattern change comprises:
(a) generating a first portion of a script comprising three positions (first, second and third positions), wherein three of the images are ordered as follows:
  i. the first position of the first script portion holds the second image;
  ii. the second position of the first script portion holds the first image; and
  iii. the third position of the first script portion holds the third image. In essence, the first image is surrounded before and after by the second and third images respectively.
(b) generating a second portion of a script comprising two positions (first and second positions), wherein the first and fourth images occupy both of these positions in any order, either first image and then fourth image, or fourth image and then first image.

Figure 1:
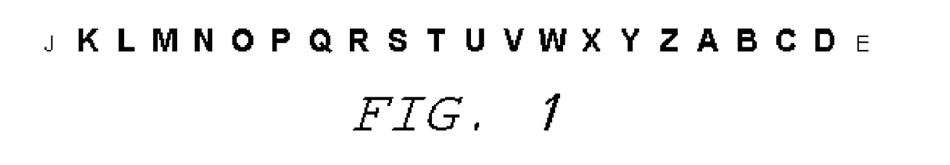
FIG. 1: This figure shows a script of images for an exemplary container #1, wherein each different letter represents a different image. Bolded letters corresponds to baseline positions for a given image within a total number of images that may span one or more scripts.
Figure 2:
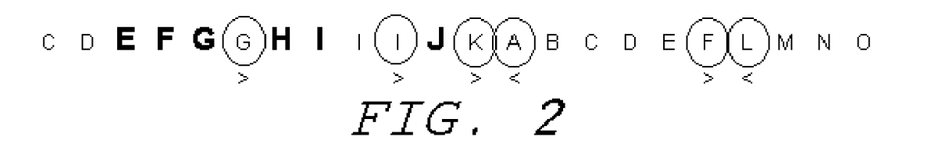
FIG. 2: This figure shows a script of images for an exemplary container #2, wherein each different letter represents a different image. Bolded letters corresponds to baseline positions for a given image within a total number of images that may span one or more scripts. Circled letters represent images around which a pattern change exists. This is within the context of the five scripts represented in FIGS. 1 through 5.
Figure 3:
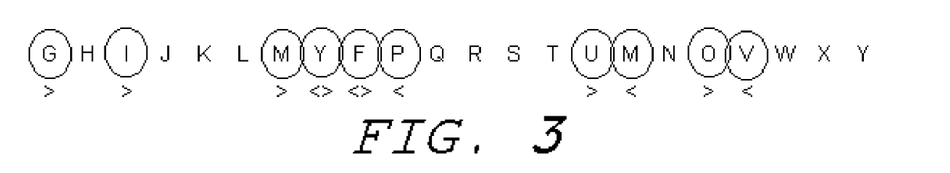
FIG. 3: This figure shows a script of images for an exemplary container #3, wherein each different letter represents a different image. Circled letters represent images around which a pattern change exists. This is within the context of the five scripts represented in FIGS. 1 through 5.
Figure 4:
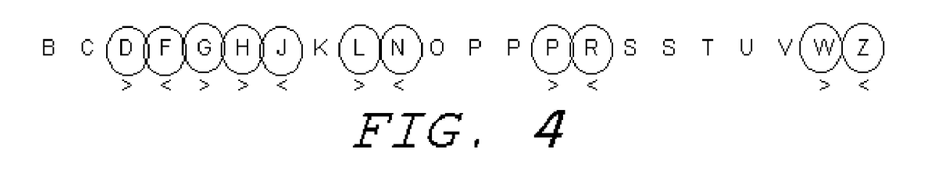
FIG. 4: This figure shows a script of images for an exemplary container #4, wherein each different letter represents a different image. Circled letters represent images around which a pattern change exists. This is within the context of the five scripts represented in FIGS. 1 through 5.
Figure 5:
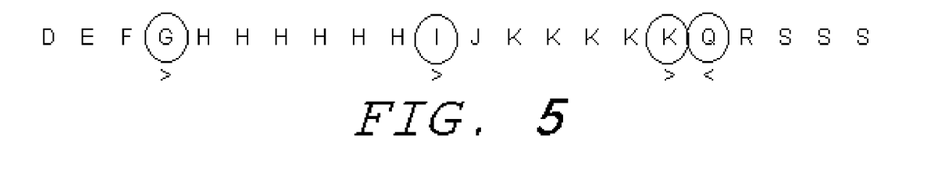
FIG. 5: This figure shows a script of images for an exemplary container #5, wherein each different letter represents a different image. Circled letters represent images around which a pattern change exists. This is within the context of the five scripts represented in FIGS. 1 through 5.

A higher proportion of images in a script around which a pattern change occurs versus a baseline portion in the script for each specific image, will deliver an increased level of variety not only within a container but also across a plurality of containers. For a given number of edible substrates sourced from a single container or multiple containers, wherein one or more edible substrates have images disposed thereon, a catalogue of images can be generated and each different image can be identified with a code. For each container examined, a script can be determined by recording which images are used and in what order, which provides a portion of a script. Note that when multiple containers are analyzed in this fashion, and scripts used for each container are determined, comparing these scripts across containers can reveal overlapping script portions across scripts that may help reveal a larger script. Once portions of scripts are available for each of various containers, the focus is then on each of the different images used by these script portions and the occurrences of these images within these script portions to determine how many of such occurrences are pattern changes versus designated baseline occurrences for each different image. A baseline occurrence for a given image can be any occurrence of the image where the preceding and following images are known, with an exception noted below. For example, FIG. 1 shows a script of images as used in a first container, from which a baseline can be designated for images K through D highlighted in bold and larger letter size. Images J and E are missing the preceding or following image respectively, and as such, cannot be designated as baseline occurrences for these two images within the script in FIG. 1. Note that an occurrence of an image designated as baseline is what determines what the second and third images are for any given image which is taken as a first image per the procedure above to create a pattern change. For example, for image 'M' in FIG. 1, if we take 'M' as the first image, then the second image would be 'L' and the third image would be 'N'. Note also that even if an image has a known preceding and following image within a script at a given position in the script, such position may not serve as baseline if the potential second and third images are equal among themselves since that violates the requirement for making a pattern change per this particular embodiment. This is the exception noted earlier. FIGS. 2, 3, 4 and 5 show scripts of images as used in a second, third, fourth and fifth container respectively. From FIG. 2 we can establish a baseline occurrence for images J and E since within this second script we have information for what images come before and after each of these two images, and the exception is not violated. Additionally, images F through I are new images that were not available in the first script portion of FIG. 1. For each of these new images, in this particular example, we can also establish a baseline occurrence. However, note that image G appears twice, and that image I appears three times. In the case of image G either one of the two occurrences could have been chosen for a baseline. In the case of image I, either the leftmost or rightmost occurrence could have been chosen for a baseline, but not the center image I, since it is surrounded by potential second and third images that are equal among themselves, and in this particular example, they are also equal to the potential first image I (the one in the center).

FIGS. 1 through 5 also show, in circles, the images for which a pattern change exists as compared to their corresponding baselines. A symbol under the circle indicates whether the pattern change exists as a result of the image to the left in the script (<), or as a result of the image to the right in the script (>), or both as a result of the image to the left and to the right (<>). Given the example of image 'M' in FIG. 1, where it is taken as the baseline with second image 'L' and third image 'N', any instance where 'M' is preceded or followed by an image different than 'L' or 'N' would be an instance where a pattern change exists. Such is the case in FIG. 3, where there are two instances where 'M' is involved in a pattern change. In the first instance 'M' is followed by 'Y', and in this case 'Y' is the fourth image. In the second instance 'M' is preceded by 'U', and in this case 'U' is the fourth image.

From these exemplary FIGS. 1 through 5, the percent of images for which there is a pattern change from the total number of script images can be calculated. Given the five figures in this particular example, each script has 22 images; the total number of images involved in this analysis is 5 scripts times 22 images per script which equals 10 images. The number of images for which a pattern change exists is the number of circled images, which for all five figures are 31 images. From this, the percentage of images for which there is a pattern change from the total is obtained by dividing the number of images for which a pattern change exists by the total number of images, which in this example is 31 divided by 10 which equals 0.2818 or 28.18%. The preferred percentage of images for which there is a pattern change in one embodiment of this invention is from about 2% to about 100%, in another embodiment from about 5% to about 100%, in yet another embodiment from about 10% to about 100%, and in still another embodiment from about 20% to about 100%.

To determine the level of pattern change in a group of samples, we must note that the higher the number of samples analyzed, the more precise the pattern change level determination is. However, since analyzing an infinite number of samples is not practical, a multi-tiered approach is taken to perform the determination. To perform this determination, an iterative process is used, wherein for simplicity a smaller number of samples are initially used, and the sample number is potentially increased up to a maximum limit. The maximum limit is a function of the average number of different images within any group of 1000 image-disposed edible substrates taken from a minimum number of containers as typically acquired by the end-consumer, and wherein the weight of image-disposed edible substrates within each of these containers is less than 10 kilograms. If no container exists wherein this weight is less than 10 kilograms, then 1 container is used and a group of 1000 image-disposed edible substrates which are in proximity to one another are used. The maximum limit will be this average number of different images within any group of 1000 image-disposed edible substrates times 100. For example, if the average number of different images within groups of 1000 image-disposed edible substrates (per the above description) is 30, then 3000 (30×100) image-disposed edible substrates is the maximum limit to be analyzed. If the average number of different images within groups of 1000 image-disposed edible substrates is 75, then 7500 image-disposed edible substrates is the maximum limit to be analyzed. The absolute maximum number of images to be analyzed is 100000, which occurs in the instance when all the images in any group of 1000 image-disposed edible substrates are different. The minimum number of image-disposed edible substrates to be analyzed is 1000.

Initially, 1000 image-disposed edible substrates are sampled. Thus, to acquire 1000 samples, multiple containers of image-disposed edible substrates may be required. For example, if containers each contain 80 image-disposed edible substrates, then the minimum number of containers to be analyzed as a group should be 13 (that is, 1000 minimum number of image-disposed edible substrates divided by 80 image-disposed edible substrates per container equals 12.5 or rounded up, equal to 13 containers). From each container, a script is determined by cataloging each of the images used among all containers, and then determining the order in which the images are found in each of the respective containers.

In any given container, it is possible that a sequence of image-disposed edible substrates is broken such as during distribution to the store. For example, if containers typically contain 80 stacked potato crisps wherein crisps are image-disposed edible substrates, and in one container only 60 crisps remain contiguously stacked, and the other 20 crisps are in a condition such that the crisps are too broken to recognize the image or are out of the stack, then only the 60 intact sequence of crisps is used for the analysis. It is also possible that a few broken crisps in the middle of the stack are broken, in a manner that prevents determining a full script for the container. In this case portions of script may be possible to be determined at either side of the broken crisps, and then one of the longest available scripts within the container is designated the script for that container.

Once the scripts are determined for each container, the scripts are analyzed according to the method above and the level of pattern change is determined. If, using 1000 image-disposed edible substrates, a positive result is obtained for this test (i.e., falls within the scope of a patent claim of interest), then the test is complete; the level of pattern change falls within the scope of the claim. If the test result is negative (i.e., result does not fall within the scope of a patent claim of interest), then the test is repeated using 1000 additional images; an additional 1000 images is added to the original 1000 for a total of 2000 and the test repeated until a positive result is obtained or the cumulative number of samples being analyzed reaches the maximum limit for number of images to be analyzed (whichever comes first). If at any point the test result is positive, then the test is complete and the pattern change is within the scope of the claim of interest. Otherwise, if after reaching the maximum limit for number of image-disposed edible substrates a negative test result is still obtained, then the result is considered negative.

For example, typical containers that can be acquired by the end-consumer contain 70 image-disposed edible substrates. A determination is conducted first to determine the average number of different images in any group of 1000 images. For this, a minimum of 15 containers are used (1000 divided by 70 equals about 14.3, which is rounded up to 15). The image-disposed edible substrates are removed from each container in a manner to retain the order in which the edible substrates were packed. In this example, and from analyzing 1000 image-disposed edible substrates from the 1050 available (15 containers×70 image-disposed edible substrates equals 1050), 120 different images are determined. Given this, the maximum limit is 12000 (120×100). Although this is just one determination from one group of 1000 image-disposed edible substrates, as more groups of 1000 image-disposed edible substrates are analyzed per the multi-tier approach of this method, the average number of different images in any group of 1000 image-disposed edible substrates is updated. Someone skilled in the art would know to use the various determinations of different images found in groups of 1000 image-disposed edible substrates and averaging them.

Now all the unique images are assigned a unique code and a script is determined from each of the 15 containers. A baseline position is established for each different image within the 15 scripts collected. Note that an image may appear in more than one script, but only one such occurrence can serve as a baseline position as mentioned earlier. Given the baseline for each image, a second image and a third image can be determined for each unique image, and the number of instances is determined where each unique image is preceded or followed by a fourth images as note earlier, that is different than the unique image in question and also different that the unique image's second and third images per its baseline position. This is performed for each unique image. In this example, the number of instances meeting this criteria for the image catalogued as #1 is 2; the number of instances meeting this criteria for the image catalogued as #2 is 0; the number of instances meeting this criteria for the image catalogued as #3 is 5; and so on. Now all these instances are added (2+0+5+ . . . ) and in this example the total number of instances meeting the criteria is 230. From this, the percent of pattern change level is 23% (i.e., 230 divided by 1000 image-disposed edible substrates analyzed). Since this is within the scope of the claim of interest, the test is completed.

In another example similar to the one above, the total number of instances meeting the criteria for pattern change is 17. From this, the percent of pattern change level is 1.7% (i.e., 17 divided by 1000 image-disposed edible substrates analyzed). Since this is outside the scope of the claim of interest, but the number of samples analyzed is less than the maximum limit initially established of 12000, then another group of 1000 image-disposed edible substrates is added to the analysis. In this example, another group of 15 containers is used and their scripts determined. The number of different images in this second group of 1000 image-disposed edible substrates is 107. Given that the number we had determined from the prior group of 1000 was 120, the new average number of different images in any group of 1000 image-disposed edible substrates is 113.5 (i.e, the average of 120 and 107), and the new maximum limit is 11350 (i.e, 113.5×100). Now from the 30 scripts in total that are available (15 from the first time and 15 from this second time), baseline positions are established for the unique images which do not yet have a baseline position established and the total number of instances meeting the pattern change criteria is determined. In this example, the total number of instances determined is 47. From this, the percent of pattern change level is 2.35% (i.e., 47 divided by 2000 image-disposed edible substrates analyzed). Since this is within the scope of the claim of interest, the test is completed.

EXAMPLES

The present invention is demonstrated by the following non-limiting examples.

Example 1

A potato dough is formed, sheeted and transported to a printing station. Also, as noted in the section above, a script is created with images from an image source, and multiple pattern changes are induced in the script. The dough is printed with an ink jet printer following the created script of images. The printed dough is then cut into individual dough pieces that are loaded into molds and fried within the molds. The image disposed fried potato snack pieces are removed from the molds, salted and conveyed to a packing station where the snack pieces are portioned and inserted into canisters. Five such canisters may display portions of script as those shown in FIGS. 1 through 5.

Example 2

A potato dough is formed, sheeted and transported to a printing station with multiple parallel printing devices to print multiple rows of snacks simultaneously. A script is created with 1200 images from an image source, and no pattern changes are induced in the script. The dough is printed with an ink jet printer following the created script of images in each of the rows of snack pieces. However, at a given point in time, while the first print head in a first row of snacks is printing image number 1 in the script, the second printing device in a second row of snacks is printing an image from the same script that corresponds to 100 images later in the script, in this case image number 101 of the same script. The printed dough is then cut into individual dough pieces that are loaded into molds and fried within the molds. The image disposed fried potato snack pieces are removed from the molds, salted and conveyed to a packing station where the snack pieces are portioned and inserted into canisters for each of the rows of snack pieces.

Example 3

Same as Example 2, but this time pattern changes are induced in the script.

Example 4

A potato dough is formed, sheeted and transported to a printing station with multiple parallel printing devices to print multiple rows of snacks simultaneously. Two scripts are created with 200 different images each from an image source, and no pattern changes are induced in the script. The dough is printed with an ink jet printer following the two created scripts of images, wherein one script is used for a first row of snack pieces, and the second script is used for a second row of snack pieces. The printed dough is then cut into individual dough pieces that are loaded into molds and fried within the molds. The image disposed fried potato snack pieces are removed from the molds, salted and conveyed to a packing station where the snack pieces are portioned and inserted into canisters for each of the rows of snack pieces.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a fabricated snack chip having an image disposed thereon, comprising:
   (a) providing at least one edible substrate;
   (b) providing an image source, wherein said image source comprises a plurality of different images;
   (c) creating a script, wherein said script comprises a first script image selected from said image source;
   (d) communicating said first script image from the script to an image disposal device;
   (e) disposing said first script image on said edible substrate with said image disposal device to form a first image-disposed edible substrate;
   (f) detecting an image on said image-disposed edible substrate;
   (g) evaluating said detected image and providing feedback as a function of the evaluation of said detected image;
   (h) communicating a second script image based on the feedback to an image disposal device;
   (i) disposing said second script image on a second edible substrate with said image disposal device to form a second image-disposed edible substrate.

2. The method of claim 1, wherein said edible substrates are uncooked sheeted dough.

3. The method of claim 1, wherein said edible substrates are fabricated snack pieces.

4. The method of claim 1, wherein said image disposal device comprises an ink jet printer.

5. The method of claim 1, wherein said fabricated snack pieces are disposed into a container.

6. The method of claim 1, wherein said first script image and said script second image comprise a question and an answer.

7. The method of claim 1, wherein said first script image and said second script image comprise different parts of the same story.

8. The method of claim 1, wherein said script includes a pattern change.

9. The method of claim 1, further comprising creating a modified script based on the evaluating said detected image step.

10. The method of claim 1, wherein a sensor is used for the detecting step.

11. The method of claim 1, wherein said image source comprises an electronic database.

12. The method of claim 1, wherein the edible substrates are provided as a stream of substances.

13. The method of claim 1, further comprising
   providing a container;
   disposing the image-disposed edible substrates into the container;
   wherein each said image-disposed edible substrate has an image different from every other said image on each said image-disposed edible substrate contained within said container, wherein the number of different images disposed upon each said image-disposed edible substrate is equal to the number of image-disposed edible substrates contained in said container.

14. The method of claim 13, wherein the number of different images disposed upon said image-disposed edible substrates is greater than or equal to 10.

15. The method of claim 13, wherein at least one image is multi-colored.

16. The method of claim 13, wherein at least one image has a resolution ranging from about 90 to about 1200 dpi.

17. The method of claim 13, further comprising a message associated with the container, wherein said message communicates to the consumer that all of the image-disposed edible substrates contained within said container have a different image disposed thereon.

18. The method of claim 1, further comprising:
providing a container;
disposing the image-disposed edible substrates wherein each said image-disposed edible substrate has an image different from every other said image on each said image-disposed edible substrate contained within said container, wherein the number of different images disposed upon said image-disposed edible substrates is equal to the number of edible substrates in one serving size of said edible substrates.

19. The method of claim 18, wherein said edible substrates are fabricated snack chips.

\* \* \* \* \*